F. D. UOMINI.
INDICATING DEVICE.
APPLICATION FILED JULY 12, 1917.
1,294,575.
Patented Feb. 18, 1919.
2 SHEETS—SHEET 1.
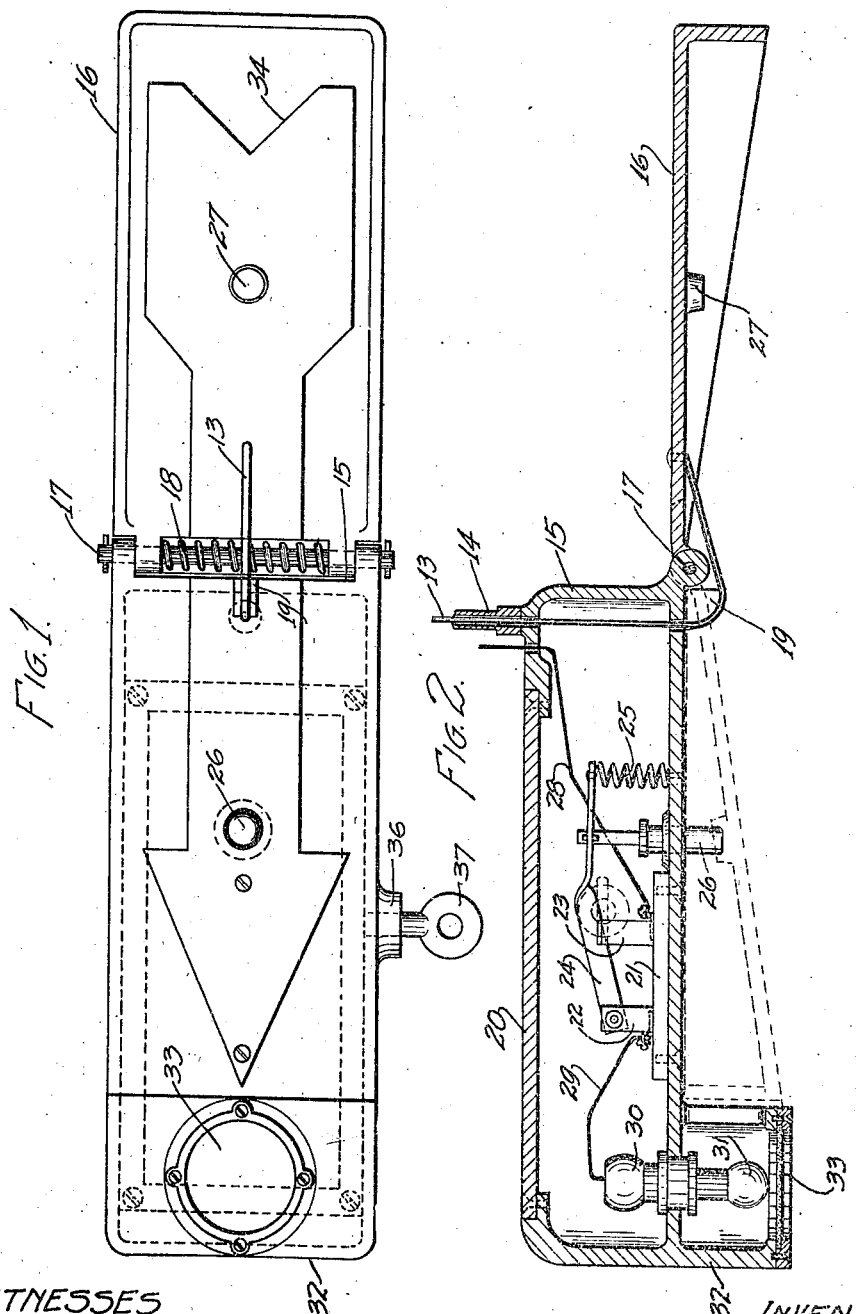

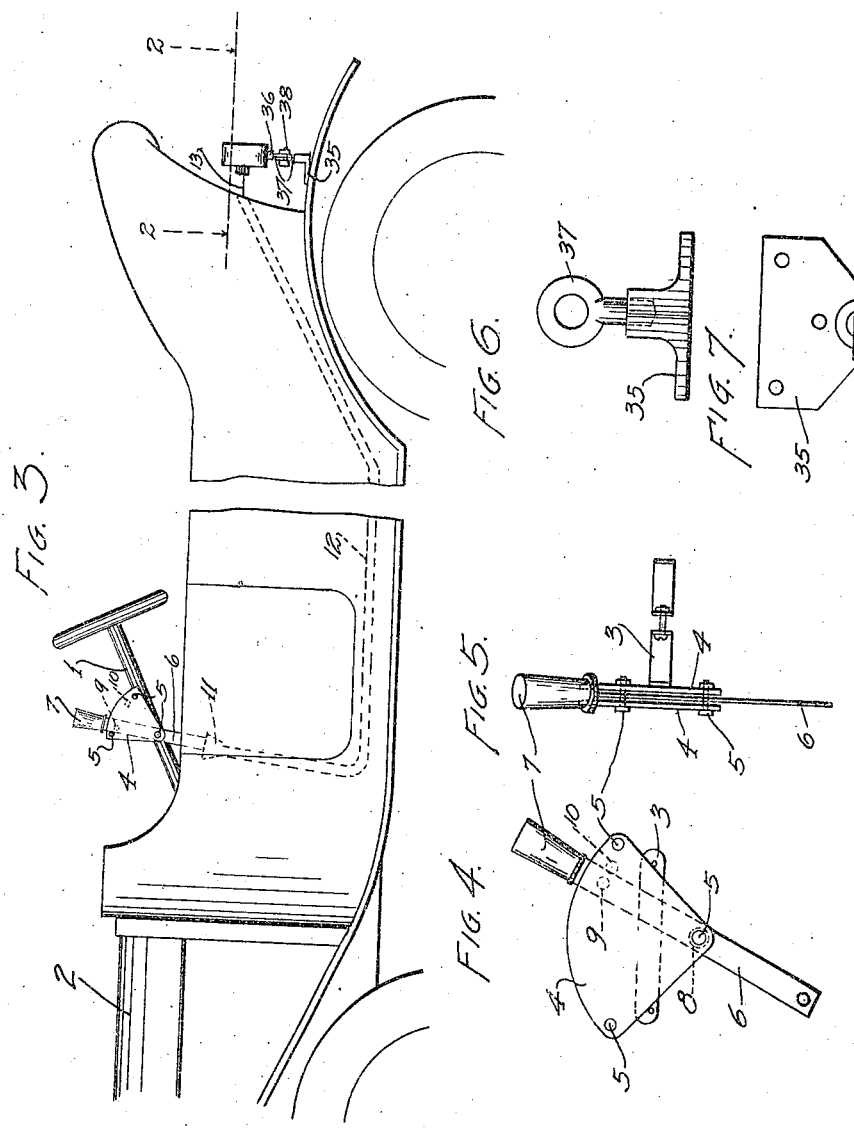

UNITED STATES PATENT OFFICE.

FRANK DEGLI UOMINI, OF PALO ALTO, CALIFORNIA.

INDICATING DEVICE.

1,294,575.  Specification of Letters Patent.  Patented Feb. 18, 1919.

Application filed July 12, 1917. Serial No. 180,217.

*To all whom it may concern:*

Be it known that I, FRANK DEGLI UOMINI, a subject of the King of Italy, residing at Palo Alto, in the county of Santa Clara and State of California, have invented certain new and useful Improvements in Indicating Devices, of which the following is a specification.

This invention relates to improvements in indicating devices and more particularly to devices of this character adapted for use on vehicles. One object is to provide a device of this character whereby a signal may be given to indicate to a following vehicle the direction in which a turn is to be made. A further object is to provide a device of this character that when closed presents a neat and plain appearance perfectly in harmony with the vehicle itself. A further object is to provide a device that is very simple in operation, efficient and reliable. With the foregoing and other objects in view the invention consists in the combination and arrangement of parts to be hereinafter fully described, pointed out in the appended claim and illustrated in the accompanying drawings which form a part of this specification and in which—

Figure 1 is a front view of the device in open position.

Fig. 2 is a section taken on line 2—2 of Fig. 3.

Fig. 3 is a fragmentary view of a vehicle illustrating the application of my indicating device.

Figs. 4, 5, 6 and 7 are fragmentary views.

Like reference characters denote corresponding parts throughout the several views.

In practice it is my intention to use two indicating devices arranged at the rear of the vehicle at opposite sides thereof and preferably arranged and supported upon the rear mud guards or fender but as each of said indicators and its coacting parts are substantially the same I have shown and described but one. To the steering column 1 of a vehicle 2 I secure, by means of the clamp 3, the segments 4, 4 which are connected by the screw 5. A lever 6, provided with a handle 7, is arranged between the segments 4, 4 and fulcrumed upon one of the screws 5 and a spring 8 encircling said screw abuts the lever and one segment 4 to yieldingly retain a lug 9 of said lever in a depression 10 formed in one of the segments. The lever 6 is disposed in the enlarged end 11 of a flexible tube 12 which extends to the rear end of the vehicle, said lever being connected to a wire 13 movable with said lever longitudinally of the tube, said wire extending through a plug 14 and through a casing 15 carrying said plug and being connected to a door 16 connected by hinge 17 to the said casing. A spring 18 encircling said hinge 17 serves to yieldingly retain said door 16 in open or extended position with relation to the casing as shown in full lines in Fig. 2. The wire 13 after passing through the casing 15 passes about a segmental lug 19 of said casing which merely serves as a bearing surface for the wire to permit easy movement of the same.

The casing 15 is provided with a removable top 20 and interiorly with the switch block 21 provided with the posts 22, 23 to the former of which the arm 24 is pivotally connected, said arm being normally in contact with the post 23 to close the electric circuit, said arm being yieldingly retained in normal position by the spring 25 connecting the same and the casing 15. A plunger 26 connected to the arm 24 extends through the casing 15 for engagement with a button 27 carried by the said door 16 whereby said arm 24 may be raised out of engagement with the post 23 to break the circuit when the door is closed or moved to the position shown dotted in Fig. 2. A copper wire 28 runs from post 23 to the battery (not shown) and another wire 29 extends from the post 22 to the lamp 30 carried by said casing, the globe 31 being disposed in a frame 32 integral with said casing, said globe when illuminated being visible through the red lens 33 carried by the said frame 32. An arrow 34 is painted in white with a red border upon the casing 15 and door 16 and serves, in the open position of the door, to indicate the direction in which the vehicle is to turn. One arrow points to the right and one to the left upon opposite sides of the vehicle. Normally the door 16 is closed and the lug 9 of lever 6 disposed in the depression 10. When a turn is to be made the operator moves the lever 6, through the medium of its handle, to withdraw the lug 9 from depression 10 when the spring 18 will open the door 16 upon its hinge. The arrow will then denote the direction of the turn to be made and the spring 25 will move the arm 24 into contact with the post 23 thus closing the electrical circuit and illuminating the globe 31 upon the right or left hand side of the vehicle as the case may be. After the turn is made the lever 6 may again be moved into position to dispose the lug 9 in the depression 10. The casing is supported by brackets 35, 36 provided with eyebolts 37 which may be connected by set screws 38 whereby said casing is supported.

What is claimed is:—

In combination with a vehicle, a casing, a stationary and normally deënergized lamp within said casing, a plunger arranged in said casing and operatively associated with said lamp, a door hinged to said casing to open away from and close against said casing, said door being normally retained in closed position, said door and casing having a signal painted thereon visible in the open position of said door, a button carried by said door for operative engagement with said plunger in the closed position of said door, and manually operable means carried by the vehicle and engaging said door whereby the same may be opened to energize and visualize said lamp and to visualize said painted signal.

In testimony that I claim the foregoing as my own I have hereto affixed my signature in the presence of two subscribing witnesses.

FRANK DEGLI UOMINI.

Witnesses:
　WILLIS L. HALL,
　F. SCHNEIDER.